United States Patent
Kim

(10) Patent No.: US 8,988,703 B2
(45) Date of Patent: Mar. 24, 2015

(54) IMAGE FORMING SYSTEM AND PROGRAM INSTALLATION METHOD THEREOF

(75) Inventor: Haeng-nan Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1514 days.

(21) Appl. No.: 11/288,315

(22) Filed: Nov. 29, 2005

(65) Prior Publication Data

US 2006/0119889 A1 Jun. 8, 2006

(30) Foreign Application Priority Data

Dec. 7, 2004 (KR) ................................ 2004-102265

(51) Int. Cl.
*G06F 3/12* (2006.01)
(52) U.S. Cl.
CPC ............ *G06F 3/1286* (2013.01); *G06F 3/1204* (2013.01); *G06F 3/1225* (2013.01); *G06F 3/1288* (2013.01)
USPC .......................... 358/1.15; 358/1.16; 717/176
(58) Field of Classification Search
USPC ................................................. 358/1.1–1.16
See application file for complete search history.

(56) References Cited

U.S. PATENT DOCUMENTS

| | | | | |
|---|---|---|---|---|
| 5,546,595 | A * | 8/1996 | Norman et al. ................. | 710/10 |
| 5,862,310 | A * | 1/1999 | Crawford et al. ............ | 358/1.18 |
| 6,378,128 | B1 * | 4/2002 | Edelstein et al. ............. | 717/174 |
| 6,631,407 | B1 * | 10/2003 | Mukaiyama et al. ......... | 709/223 |
| 6,744,450 | B1 * | 6/2004 | Zimniewicz et al. ......... | 715/841 |
| 7,398,480 | B2 * | 7/2008 | Zimniewicz et al. ......... | 715/841 |
| 7,600,107 | B2 * | 10/2009 | Kato ................................ | 713/1 |
| 2003/0051011 | A1 * | 3/2003 | Schacht et al. ................ | 709/221 |
| 2003/0066066 | A1 * | 4/2003 | Nguyen et al. ................ | 717/178 |
| 2004/0015959 | A1 * | 1/2004 | Kobayashi ..................... | 717/174 |
| 2004/0030810 | A1 * | 2/2004 | Lozano ............................ | 710/8 |

FOREIGN PATENT DOCUMENTS

| | | |
|---|---|---|
| JP | 11-110223 | 4/1999 |
| JP | 11-327828 | 11/1999 |
| JP | 2002-287923 | 10/2002 |

* cited by examiner

*Primary Examiner* — Benny Q Tieu
*Assistant Examiner* — Michael Y Tzeng
(74) *Attorney, Agent, or Firm* — Staas & Halsey LLP

(57) ABSTRACT

A program installation method of an image forming system in which an image forming apparatus having a web server is connected to a host device via a network. The method includes storing programs which are used when the image forming apparatus is in use, receiving information about the host device as the web server is driven, determining whether the stored programs are installed at the host device based on analysis information which is a result of analyzing information about the host device, and installing a predetermined program of the stored programs at the host device based on the analysis information. Accordingly, the program for use with the image forming apparatus is easily installed at the host device, and also an optimal program is installed at the host device. Therefore, a wrong program installation can be prevented, and thus errors are prevented during use of the image forming apparatus.

6 Claims, 3 Drawing Sheets

IMAGE FORMING SYSTEM AND PROGRAM INSTALLATION METHOD THEREOF

CROSS-REFERENCE TO RELATED APPLICATIONS

This application claims the benefit of Korean Patent Application No. 2004-102265, filed on Dec. 7, 2004, in the Korean Intellectual Property Office, the entire contents of which are incorporated herein by reference.

BACKGROUND OF THE INVENTION

1. Field of the Invention

The present general inventive concept relates to an image forming system and a program installation method thereof. More particularly, the present general inventive concept relates to an image forming apparatus system allowing pre-stored programs of an image forming apparatus to be installed at a host device connected to the image forming apparatus via a network, and a program installation method thereof.

2. Description of the Related Art

In order for a user to effectively use an image forming apparatus, a predetermined program must be installed at a host device connected to the image forming apparatus. For example, if the image forming apparatus is a printer, a printer driver must be installed at a host device connected to the printer in order for a user to be able to use the printer.

Programs required for using the image forming apparatus are distributed to users who buy the image forming apparatus. The programs are typically stored at various storage media, such as a CD or a diskette. Accordingly, purchasers themselves have to directly install the required programs at the host device.

Since a user deals with the medium storing the programs separately, the medium is very likely to be lost. Also, only one medium storing the programs is distributed to one purchaser. If the purchaser loses the medium, it is difficult for the purchaser to determine which program is to be installed at the host device. To this end, a wrong program may be installed at the host device, and thus errors may occur during the use of the image forming apparatus.

Also, if the image forming apparatus is shared by a plurality of host device users in a network environment, each user has to bring a medium storing programs to a place where the host device is located, which causes an inconvenience to the user.

SUMMARY OF THE INVENTION

The present general inventive concept has been developed in order to solve the above problems in the related art. Accordingly, an aspect of the present general inventive concept is to provide an image forming system which automatically installs a pre-stored driving program of an image forming apparatus at a host device connected to the image forming apparatus via a network, and a method thereof.

The foregoing and/or other aspects and utilities are achieved by providing an image forming system including an image forming apparatus that has a web server and stores programs used when the image forming apparatus is in use, and a host device receiving a predetermined program of the programs stored in the image forming apparatus that is not installed at the host device, and to install the received program therein.

Additional aspects and advantages of the present general inventive concept will be set forth in part in the description which follows and, in part, will be obvious from the description, or may be learned by practice of the general inventive concept.

The image forming apparatus of the system may include the web server which allows the host device to check a condition of the image forming apparatus and transmit a control command, the web server providing information at the request of the host device, a storage part to store the programs that are used when the image forming apparatus is in use, an analysis part to analyze information about the host device transmitted from the host device, and based on the analysis information, to determine whether the stored programs are installed to the host device, a controller to control based on the analysis information such that a predetermined program of the stored programs is transmitted to the host device, and an installation part to install the predetermined program at the host device.

The controller can store information as to whether the predetermined program is an indispensable program necessarily required for using the image forming apparatus, and the controller can control an operation of the installation part according to the stored information.

If the predetermined program is an indispensable program, the installation part can automatically install the indispensable program.

If the predetermined program is a dispensable program, the installation part can install the dispensable program on receipt of a dispensable program installation command.

If the predetermined program is a dispensable program, the controller can generate a list containing dispensable programs and can display the list on the host device.

The information about the host device can include an operation system of the host device, an address of the host device, a configuration file to determine which program is installed to the host device, and a user name of the host device.

The web server can be an embedded web server (EWS).

The foregoing and/or other aspects of the present general inventive concept can also achieved by providing a program installation method of an image forming system in which an image forming apparatus having a web server is connected to a host device via a network. The method includes storing programs which are used when the image forming apparatus is in use, receiving information about the host device as the web server is driven, determining whether the stored programs are installed at the host device based on analysis information which is a result of analyzing information about the host device, and installing a predetermined program of the stored programs based on the analysis information.

The method may further include storing information about an indispensable program of the stored programs that is necessarily required for using the image forming apparatus, and determining whether to automatically install the predetermined program according to the stored information.

If the predetermined program is determined to be an indispensable program based on the stored information, the indispensable program can automatically be installed at the host device.

If the predetermined program is determined to be a dispensable program based on the stored information, the dispensable program can be installed on receipt of a dispensable program installation command.

The method may further include, if the predetermined program is determined to be a dispensable program, generating a list containing dispensable programs and displaying the list on the host device.

The information about the host may include an operation system of the host device, an address of the host device, a configuration file to determine which program is installed at the host device, and a user name of the host device.

The web server can be an embedded web server (EWS).

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
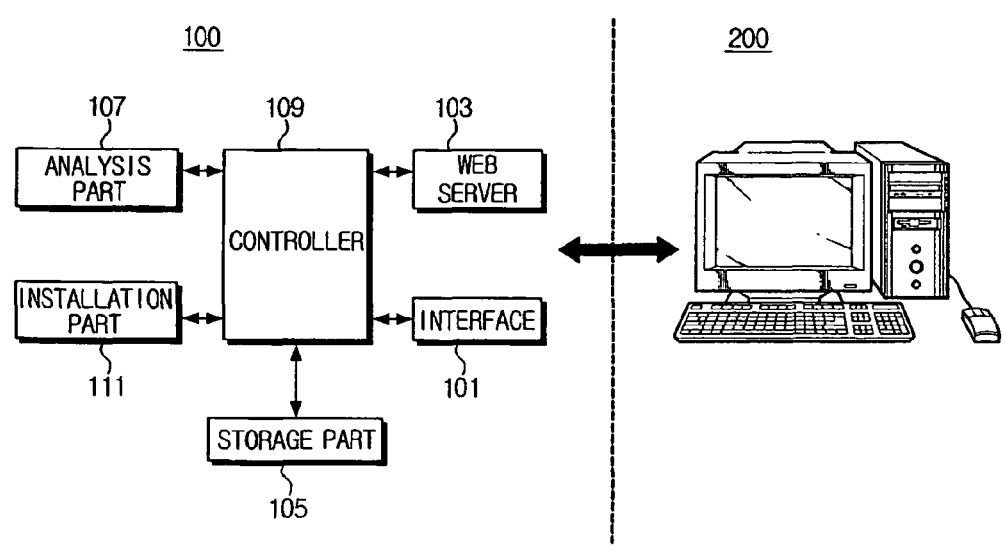
FIG. 1 is a block diagram illustrating an image forming apparatus system according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating an image forming system according to an embodiment of the present general inventive concept.

Referring to FIG. 1, an image forming system according to an embodiment of the present general inventive concept includes a printer 100 and a host device 200 connected to the printer 100 via a network. The printer 100 includes an interface 101, a web server 103, a storage part 105, an analysis part 107, a controller 109, and an installation part 111.

The interface 101 interfaces with the host device 200 to transmit and receive data to and from the host device 200. For example, information about the host device 200 is transmitted from the host device 200 to the printer 100 through the interface 101, and programs to be installed at the host device 200 are transmitted from the printer 100 to the host device 200 through the interface 101.

The information about the host device 200 includes an operation system of the host device 200, an address of the host device 200 which is required for the printer 100 to transmit a program, a configuration file to determine which program is installed at the host device 200, and a user name of the host device 200.

The web server 103 can provide information at a request of a client, i.e., the host device 200. The web server 103 allows a web browser of the host device 200 to connect the printer 100 to the Internet. Through the web server 103, the web browser of the host device 200 checks states of the printer 100 and a consumable product of the printer 100 and transmits a control command. In this embodiment, the web-server 103 is an embedded web server (EWS) and accordingly is embedded in the printer 100. However, the web-server 103 can be separate from the printer 100.

The storage part 105 stores programs for use by the host device 200 in using the printer 100. The programs include an indispensable program that is necessarily required for the host device 200 to use the printer 100 and a dispensable program, such as a job management system, that is not necessarily required but is used by the printer 100.

Since a driving program differs depending on information about the host device 200, such as an operation system of the host device 200, the storage part 105 can store different versions of driving programs for the respective host devices 200. For example, different printer drivers are installed depending on versions of window operation systems, such as window 95, window Me, and window 2000. In the linux operation system, a different printer driver is installed depending on versions of the linux operation system. Therefore, the storage part 105 stores a variety of printer drivers such that an optimal printer driver can be installed for each respective operation system.

The analysis part 107 can analyze the information about the host device 200 which is transmitted through the interface 101. More specifically, the analysis part 107 analyzes the configuration file to determine whether the programs stored in the storage part 105 are installed at the host device 200. The controller 109 stores information as to whether a program to be installed is an indispensable program, and controls the installation part 111 according to the stored information. In this case, the information as to whether the program to be installed is an indispensable program is obtained as a result of analyzing by the analysis part 107. That is, the analysis part 107 determines whether the programs to be installed at the host device 200 include an indispensable program. The information as to whether the program to be installed is an indispensable program can be information such as a printer driver is an indispensable driving program and programs other than the printer driver are dispensable programs.

The controller 109 determines which printer driver is to be installed at the host device 200 based on the information about an operation system of the host device 200, which is information analyzed by the analysis part 107.

The controller 109 detects dispensable programs that are not installed at the host device 200 based on the result of analyzing by the analysis part 107 and the information as to whether the program to be installed is an indispensable program, and generates a list of the dispensable programs. The controller 109 transmits the generated list to the host device 200 through the interface 101 so that the host device 200 can display the list.

The installation part 111 can install a program at the host device 200 according to the result of the analysis part 107. If the program to be installed at the host device 200 is an indispensable program, the installation part 111 can automatically install the indispensable program at the host device 200 under the control of the controller 109.

If the program to be installed at the host device is a dispensable program, a certain program is selected from the displayed list and the installation part 111 installs the selected program under the control of the controller 109. The installation part 111 transmits to the host device 200 the program together with an automatic installation file such that the program is automatically installed at the host device 200.

Figure 2:
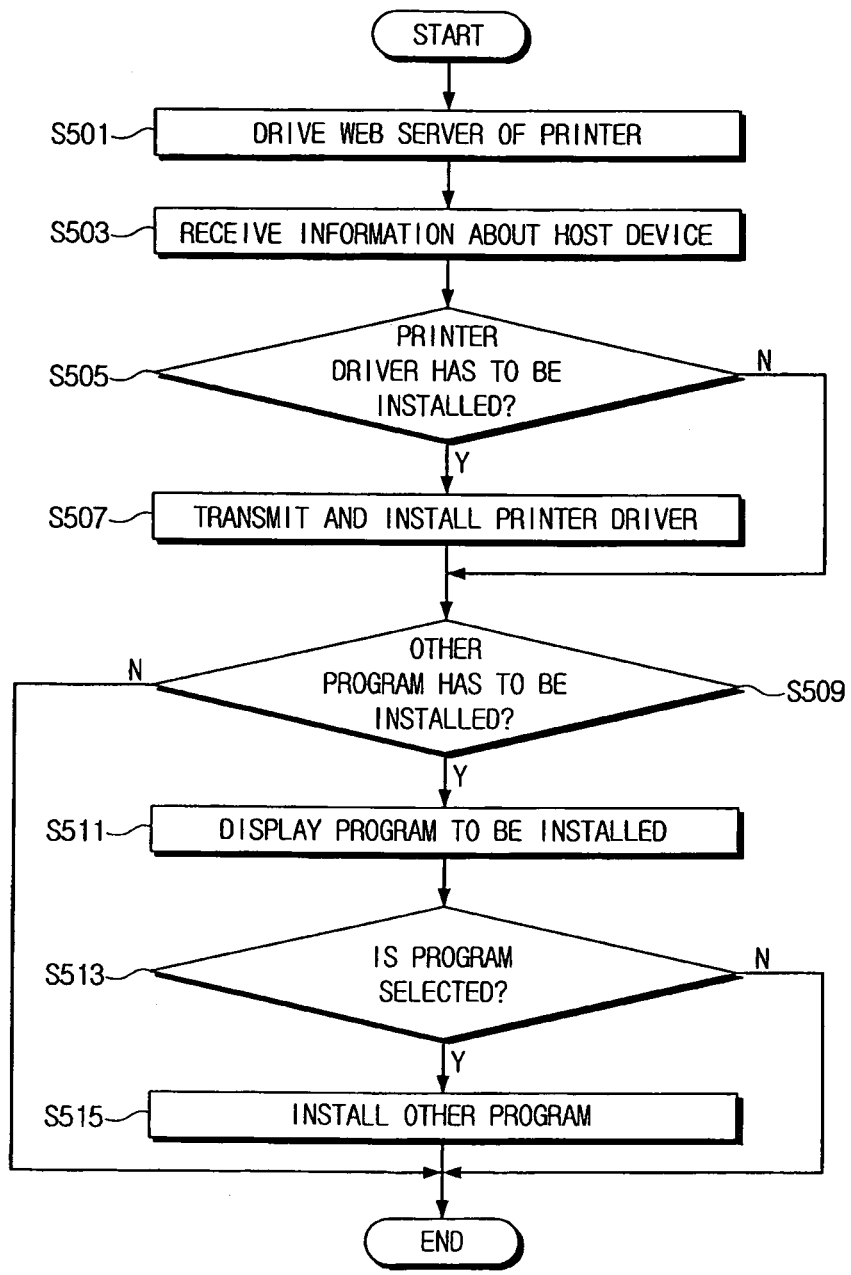
FIG. 2 is a flowchart illustrating a program installation method of an image forming apparatus system according to an embodiment of the present general inventive concept.

FIG. 2 is a flowchart illustrating a program installation method of an image forming system according to an embodiment of the present general inventive concept.

Referring to FIG. 2, a user drives the web browser of the host device 200 and inputs an information provider (IP) address of the printer 100 on the driven web browser, thereby driving the web server 103 of the printer 100, at operation S501. In this case, the printer 100 is a network printer that is connected to the host device 200 in series or in parallel, and has an IP address to network with the host device 200. The web server 103, which can be an embedded web server (EWS), allows the web browser of the host device 200 to connect the printer 100 to the Internet, check the conditions of the printer 100 and a consumable product of the printer 100, and transmit a control command to the printer 100.

As the web server 103 is driven, information about the host device 200 is transmitted to the printer 100, at operation S503. At the same time, information about the printer 100 is transmitted to the host device 200 and can be displayed on the web browser. The information about the printer 100 can include an amount of residual toner, a paper feeding state, and a printing progress. The information about the host device 200 can include a window operation system of the host device 200, information as to whether a printer driver is installed at the host device 200, a user name of the host device 200, information about which program is installed at the host device 200, and an address of the host device 200.

Next, it is determined whether a printer driver is installed at the host device 200 at operation S505. This is to forceably install the printer driver at the host device 200 if the printer driver is not already installed at the host device 200. An optimal printer driver must be installed at the host device 200 in order for the host device 200 to use the printer 100. Which printer driver is to be installed at the host device 200 is determined based on the configuration file of the host device 200.

If any printer driver is not installed at the host device 200, the information about the host device 200 is analyzed and a printer driver is selected. The selected printer driver is transmitted and installed at the host device 200 at operation S507. The controller 109 selects from the storage part 105 a printer driver most appropriate to the host device 200 using the analyzed information about the host device 200, and transmits the printer driver to the host device 200. The controller controls the installation part 111 such that the selected printer driver is installed at the host device 200. That is, the controller 109 selects the printer driver most appropriate to the host device 200 according to an operation system of the host device 200, and transmits the printer driver. The storage part 105 stores different printer drivers for each respective operation systems of the various host devices 200.

The controller 109 stores information about whether the program to be installed is an indispensable program. Accordingly, if the indispensable program, i.e., the printer driver, is not installed, the controller 109 controls the installation part 111 such that the selected printer driver is automatically installed at the host device 200.

Next, it is determined whether a program to be installed at the host device 100 is a dispensable program other than the printer driver, at operation S509. This is determined using the configuration file of the host device 200.

If it is determined that the printer driver is installed at the host device 200 at the operation S505, the process jumps to the operation S509 without installing the printer driver. That is, if the printer driver is installed at the host device 200, it is determined whether a dispensable program can be installed to the host device 200.

If programs other than the printer driver are installed at the host device 200, a list of the programs is displayed at operation S511. The controller 109 of the printer 100 generates the list of the dispensable programs that are not installed at the host device 200, and transmits the list to the host device 200 such that the list can be displayed.

Since the dispensable programs other than the printer driver are selectively installed, the list of the dispensable program can be displayed for a user to select and install a program.

The program selected from the list is installed at the host device 200 at operation S513. When a user selects a program he/she wants to install at the host device, the selected program is transmitted from the storage part 105 of the printer 100 to the host device 200 through the interface 101. On the other hand, if there is no program the user wants to install, the process is completed.

When a predetermined program is selected from the displayed list, an installing command is transmitted to the printer 100. According to the installing command, the controller 109 controls such that the selected program is transmitted to the host device 200 through the interface 101 and the installation part 111 installs the selected program at the host device 200.

Figure 3:
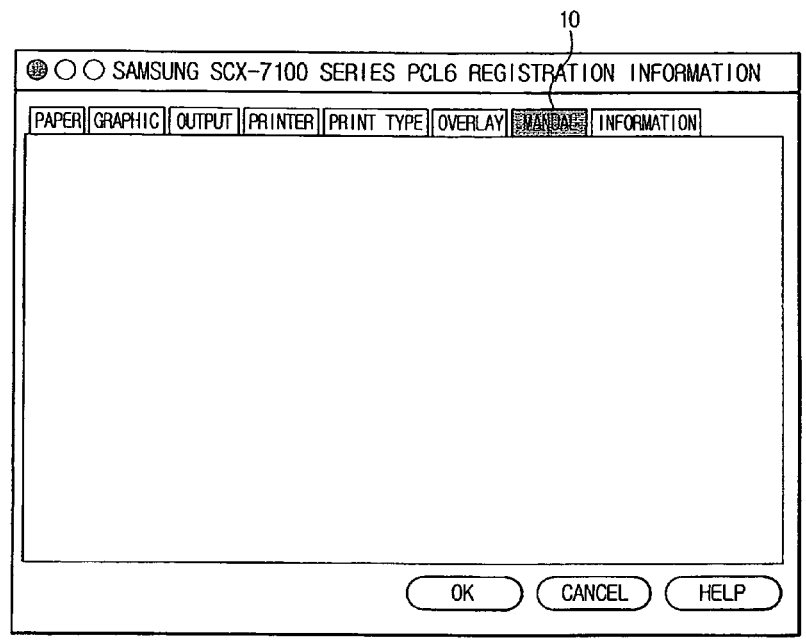
FIG. 3 is a view illustrating a printer driver which can be installed at a host device by a printer and provides a manual menu according to an embodiment of the present general inventive concept.

FIG. 3 is a view illustrating a printer driver having a menu about a manual for the printer 100, which is installed at the host device 200 according to FIG. 1.

Referring to FIG. 3, a printer driver automatically installed to the host device 200 by the printer 100 according to FIG. 1 has a manual menu 10. The storage part 105 of the printer 100 stores not only the programs for use by the printer 100 but also a manual about the printer 100. If the manual menu 10 is selected, contents of the manual is transmitted from the storage part 105 to the host device 200 and displayed on the host device 200. Therefore, since the contents of the manual are provided to the user when the printer driver is installed, it is not necessary to distribute the manual as a separate product.

As described above, the programs used in the image forming apparatus are easily installed at the host device 200, and also the most appropriate program can be installed. Accordingly, a wrong program is prevented from being installed at the host device 200, and thus errors can be prevented.

Since it is not necessary to distribute the program used in the image forming apparatus as a separate product to a purchaser, manufacturing costs can also be decreased.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A program installation method of an image forming apparatus having an embedded web server (EWS), which is connected to a host device via a network, the method comprising:

storing programs which can be used when the image forming apparatus is in use and information about an indispensable program of the stored programs that is necessarily required to be used by the image forming apparatus;

receiving, by the embedded web server, a request from the host device, the embedded web server with an IP address of the image forming apparatus;

receiving, by the embedded web server, information about the host device from the host device, the information about the host device including an operation system of the host device, an address of the host device, a configuration file to determine which program is installed at the host device, and a user name of the host device;

determining whether the stored programs are installed at the host device based on the information about the host device and whether to automatically install a predetermined program in accordance with the stored information of the indispensable program;

installing the predetermined program of the stored programs at the host device; and determining whether at least one dispensable program of the stored programs is not installed on the host device, generating a list of the dispensable programs that have not been installed according to the determination, and transmitting the generated list to the host device wherein, if the predetermined program is determined to be the indispensable program based on the stored information, the indispensable program is automatically installed at the host device, and if the predetermined program is determined to be a dispensable program, displaying the generated list on the host device, and receiving a selection of at least one of the dispensable programs on the list to be installed on the host.

2. An image forming control system, comprising:

an image forming apparatus to form images and having programs stored therein that can be used by the image forming apparatus, and information about an indispensable program; and a host device connected to the image forming device through a network, to transmit a request to an embedded web server having an IP address of the image forming apparatus and to transmit information about the host device, the information about the host device including an operation system of the host device, an address of the host device, a configuration file to determine which program is installed at the host device, and a user name of the host device, the image forming apparatus including:

an interface to interface with the host device to transmit and receive data to and from the host device;

an analysis part to determine whether the stored programs are installed on the host device based on the information about the host device, to determine whether to automatically install a predetermined program of the stored programs in accordance with the stored information of the indispensable program, to determine whether at least one dispensable program of the stored programs is not installed on the host device, to generate a list of the dispensable programs that have not been installed according to the determination, and to transmit the generated list to the host device through the interface;

a controller to control installation of the predetermined program in the host computer; and an installation part to install the predetermined program at the host device, wherein, if the predetermined program is an indispensable program, the installation part automatically installs the indispensable program, and if the predetermined program is a dispensable program, the controller displays the generated list on the host device, and receives a selection of at least one of the dispensable programs on the list to be installed on the host.

3. The image forming system as claimed in claim 2, wherein the programs stored in the image forming apparatus include indispensable programs necessary for host devices to use the image forming apparatus and at least one dispensable program not necessary to use the image forming device.

4. The image forming system as claimed in claim 2, wherein the programs are sent from the image forming apparatus to the host device through the interface.

5. An image forming apparatus which may be connected to a host device, the image forming apparatus comprising:

a web server having an IP address of the image forming apparatus, the web server to receive a request for information by the host device;

a storage part to store programs which can be used when the image forming apparatus is in use, and to store information as to whether a predetermined program is an indispensable program necessarily required to be used by the image forming apparatus;

an analysis part to determine whether the stored programs are installed at the host device based on the information about the host device transmitted from the host device, the information about the host device including an operation system of the host device, an address of the host device, a configuration file to determine which program is installed at the host device, and a user name of the host device, and whether to automatically install a predetermined program in accordance with the stored information on the indispensable program, and the analysis part to determine whether at least one dispensable program of the stored programs is not installed on the host device, to generate a list of the dispensable programs that have not been installed according to the determination, and to transmit the generated list to the host device through the interface;

a controller to control a transmission of the predetermined program of the stored programs to the host device; and an installation part to install the predetermined program at the host device wherein, if the predetermined program is an indispensable program, the installation part automatically installs the indispensable program, and if the predetermined program is a dispensable program, the controller displays the generated list on the host device, and receives a selection of at least one of the dispensable programs on the list to be installed on the host.

6. The image forming apparatus as claimed in claim 5, wherein the web server is an embedded web server (EWS) to allow the host device to check a condition of the image forming apparatus and transmit a control command, the embedded web server (EWS) providing information at the request of the host device.

* * * * *